United States Patent Office 3,157,628
Patented Nov. 17, 1964

3,157,628
PROCESS FOR INHIBITING GEL FORMATION IN POLYETHYLENE BY USE OF A-STAGE PARA - TERTIARYALKYLPHENOL - FORMALDEHYDE RESINS
Russell P. Hill and William J. Tabar, Charleston, W. Va., assignors to Union Carbide Corporation, a corporation of New York
No Drawing. Filed Jan. 4, 1963, Ser. No. 249,347
5 Claims. (Cl. 260—94.9)

This invention relates to a method of inhibiting the formation of gels in solid polyethylene. More particularly, this invention relates to an improved, high pressure, free-radical initiated, ethylene polymerization process wherein the addition of minor amounts of certain phenol-formaldehyde resins to the polymerization system markedly reduces the formation of undesirable gel particles in the polymer.

Processes for the production of polyethylene at pressures from about 50 to about 8000 atmospheres, or more, and temperatures from about 100 to about 350° C., or more, have been known for many years and have attained great commercial importance. Such high pressure processes commonly utilize free-radical initiators or catalysts to promote the polymerization; for example, oxygen, organic peroxides, inorganic peroxides, or azo compounds. A serious problem in the manufacture of solid polyethylene by these methods, which to date the art has not been able to satisfactorily overcome, is the occurrence of gels in the polymer. These gels, which vary in character from small hard particles to large soft particles and are considered to be composed of high molecular weight, cross-linked molecules, form bubble-like inclusions in polyethylene film that are commonly known in the art as "fisheyes" or "lenses," depending on their size, and are hereinafter referred to as fisheyes. The presence of fisheyes is particularly undesirable in extruded film, which presently comprises the major use of high pressure polyethylene, because they detract from the appearance of the film and also because the gels from which they are formed can cause extrusion difficulties, most notably with tubular extruded film. Fisheyes also detract from the appearance of molded and extruded polyethylene articles and are particularly troublesome with polyethylene intended for use in wire and cable coatings that will be exposed to sunlight. In this latter case, the polyethylene is usually compounded with a small amount of carbon black to avoid the degradative effects of sunlight on the polymer; but the fisheyes tend to function as "windows" for ultraviolet light to pass through the screen of dispersed carbon black.

Prior art methods of avoiding the detrimental effects of gels in polyethylene include grinding gel-containing polyethylene resins in high shear equipment such as Banbury mills, using screenpacks to filter out the unwanted particles, or the process disclosed in United States Patent 2,935,502. Such methods are costly and undesirable; involving the use of considerable additional equipment in the case of grinding and, in case of filtering, necessitating shutdowns, which in themselves bring about an increase in the rate of gel formation, in order to change the screen packs when the pores are blinded.

The present invention provides a simple and effective method of eliminating the problems arising from the presence of gels in polyethylene, without resort to the use of additional processing equipment, by largely preventing gels from forming. It has been discovered that the formation of gels in solid polyethylene can be effectively inhibited and to a large extent prevented by introducing into the polymerization system small amounts of certain low molecular weight resins as gel-formation inhibitors. The suitable low molecular weight resins are a limited group of condensation products of para-tertiaryalkylphenols and formaldehyde. These para-tertiaryalkylphenol-formaldehyde resins have been found to be capable of effectively inhibiting the formation of gels in solid polyethylene, without detrimentally affecting the polymerization process or the physical characteristics of the polymer, when they are added to the polymerization mixture in suitable concentrations and are introduced into the polymerization system at the proper point, as will be hereinafter described in greater detail.

The novel method of the present invention is operative under the conventional conditions of free-radical initiated, high pressure, ethylene polymerization regardless of catalyst type, temperature, pressure, or the presence of modifiers such as chain transfer agents and diluents in the polymerization reaction system. Although applicants do not wish to be bound by the consequences of any theoretical explanation for the function of the para-tertiaryalkylphenol-formaldehyde resins in preventing gel formation, these compounds are believed to serve as temperature stable free-radical traps, terminating the free-radicals that remain in the reaction system at the completion of the polymerization and thus making them incapable of further reacting with polymer molecules through intermolecular transfer to form higher molecular weight, cross-linked molecules that appear as gels and produce fisheyes in films.

The low molecular weight para-tertiaryalkylphenol-formaldehyde resins suitable for use in this invention are the A-stage resins produced by the reaction of para-tertiaryalkylphenols with formaldehyde in the presence of a suitable catalyst by procedures well known in the plastics art. Among the para-tertiaryalkylphenols which can be used in producing the A-stage resins by reaction with formaldehyde are the para-tertiaryalkylphenols wherein the tertiaryalkyl group contains from 4 carbon atoms to about 20 carbon atoms or more, preferably from 4 to about 12 carbon atoms, such as para-tertiarybutylphenol, para-tertiaryamylphenol, para-tertiaryhexylphenol, para-tertiaryheptylphenol, para-tertiarynonylphenol, para-tertiarydodecylphenol, and the like.

The A-stage of a phenol-formaldehyde resin is the early stage in the production of these thermosetting resins in which the product produced is still soluble in certain organic solvents and is also fusible. This stage in the production of thermosetting resins is distinguished from the B-stage and C-stage. The B-stage is an intermediate stage in the reaction of a thermosetting resin in which the product softens when heated and swells when in contact with the organic solvents, but does not entirely fuse or dissolve. The C-stage is the final stage in the reaction of a thermosetting resin in which the material is relatively insoluble and infusible; thermosetting resins in a fully cured plastic are in this stage. Illustrative of the A-stage para-tertiaryalkylphenol-formaldehyde resins that are useful for the purposes of this invention one can mention para-tertiarybutylphenol-formaldehyde resin, para-tertiaryamylphenol-formaldehyde resin, para-tertiarynonylphenol-formaldehyde resin, para-tertiarydodecylphenol-formaldehyde resin, and the like. Also, mixtures of two or more of the suitable para-tertiaryalkylphenol-formaldehyde resins can be employed.

It has been found that the undesirable gel formation which normally occurs in production of polyethylene by the conventional, free radical initiated, high pressure process can be largely prevented by incorporating in the polymerization reaction system small amounts, sufficient to reduce gel formation in the polyethylene, of the hereinbefore described A-stage para-tertiaryalkylphenol-formaldehyde resins. The suitable A-stage para-tertiaryalkylphenol-formaldehyde resins can be added to the reaction system in an amount from about 0.02 percent or less to about 0.50 percent or more based on the weight of polyethylene; preferably in an amount from about 0.05 to about 0.20 percent. Concentrations below about 0.02 percent have been found to be generally ineffective in preventing gel formation; while concentrations greater than the maximum specified have been found to be less effective than the optimum concentration. In general, the optimum suitable amount of the A-stage para-tertiaryalkylphenol-formaldehyde resin, within the range specified, is greater for A-stage para-tertiaryalkylphenol-formaldehyde resins of higher molecular weight and less for those of lower molecular weight.

The A-stage para-tertiaryalkylphenol-formaldehyde resin can be introduced into the polymerization system in any suitable manner; for example, as a dilute solution containing up to several weight percent of the resin in an organic solvent. Illustrative of suitable organic solvents which can be used one can mention acetone, toluene, benzene, isopropanol, acetaldehyde, and the like. While the manner of introducing the A-stage para-tertiaryalkylphenol-formaldehyde resin into the polymerization system is not critical, the resin must be introduced into the system at a suitable point if it is to serve as an effective means of preventing gel formation. Thus, the resin must be introduced before appreciable gel formation has taken place. On the other hand, it must not be introduced too early in the course of the polymerization reaction or it may seriously reduce the extent of conversion of monomer to polymer and in fact, if added in sufficiently high concentration at the beginning of the reaction, could prevent the formation of polymer entirely. The resin should be added at, or preferably somewhat before, the time when the desired degree of conversion of ethylene to polyethylene has been reached. However, the exact manner in which the invention is best employed is dependent upon the type and size of reactor involved, upon the extent to which a decrease in conversion can be tolerated, and upon the degree by which it is desired to reduce gel formation; and would be understandable to the average person skilled in this art from the instant disclosure.

Processes for production of high pressure polyethylene to which the subject invention is primarily applicable are continuous processes wherein a flow of ethylene is maintained in a direction parallel to the axis of an elongated reaction zone wherein the polymerization takes place. By the term "elongated reaction zone" is contemplated the reaction zone defined by the conventional tubular reactor into which ethylene along with a suitable free-radical initiator is introduced under pressure at the reactor inlet and from which a mixture of compressed gaseous ethylene and hot liquid polyethylene is removed through a product valve at the reactor outlet. The polyethylene is separated from the unreacted ethylene, which is normally recycled to the reactor, and stored in a product receiver where it may remain at high temperature for several hours. Usually the ethylene and the free-radical initiator are introduced into the tubular reactor together so that polymerization commences at or near the reactor inlet; but the initiator can, of course, be introduced some distance downstream from the point of introduction of the ethylene if desired, so that polymerization commences at a point some distance from the reactor inlet. In either case, by the term "elongated reaction zone" as used herein is meant the zone extending from a reaction zone inlet, defined as the initial point in the reactor at which ethylene in contact with the suitable free-radical initiator is subjected to a combination of both elevated temperature and pressure at which polymerization of ethylene to polyethylene takes place, to a reaction zone outlet, defined as the point at which the polymerization reaction products are removed from the reactor.

The variables affecting the degree of conversion of ethylene to polyethylene include the type and amount of free-radical initiator employed, the temperature, the pressure, and the total throughput in relationship to the length and diameter of the reactor. The effects of each of these variables and their inter-relationship with one another are well known in the art and their optimization to achieve maximum production forms no part of the present invention; which is instead concerned with producing an improved polyethylene product in the conventional high pressure process operated under suitable known conditions by use of A-stage para-tertiaryalkylphenol-formaldehyde resins as gel-formation inhibitors.

It has been found that inhibition of gel-formation in polyethylene resins without excessive reduction in conversion of monomer to polymer can, in general, be achieved by introducing the A-stage para-tertiaryalkylphenol-formaldehyde resins in suitable concentration into the tubular reactor at a point located at a distance from the reactor inlet of more than about half of the total reactor length. Introduction of the A-stage resin into the tubular reactor in effective concentration at a distance from the reactor inlet of less than about half of the total length of the reactor has been found to result in undesirable reduction in the degree of conversion. Defining the suitable point of introduction more specifically in terms of the heretofore defined "elongated reaction zone," the A-stage para-tertiaryalkylphenol-formaldehyde resin can be introduced into said reaction zone within a region extending from about the mid-point of the reaction zone to the reaction zone outlet, preferably within a region extending from a point at about 60 percent to a point at about 95 percent of the total distance from the reaction zone inlet to the reaction zone outlet.

Under the operating conditions commonly employed in the production of high pressure polyethylene the polymerization reaction is largely complete when the ethylene-polyethylene stream reaches the section of the tubular reactor near the product valve so that in this region a condition of low free-radical concentration and relatively high polymer concentration exists. These conditions can readily lead to the formation of high molecular weight gel-containing material. By introducing the para-tertiaryalkylphenol-formaldehyde resin into the reaction zone within a region extending from about 60 to about 95 percent of the distance from the inlet to the outlet of the reaction zone, as described above, the free radicals present in the system are terminated before they can cause gel to form; yet the conversion of ethylene to polyethylene is not significantly reduced. The amount of para-tertiaryalkylphenol-formaldehyde resin that can be introduced is somewhat dependent upon the point at which it is injected into the reactor; that is, higher concentrations of resin should be introduced at a point nearer the product valve to minimize the effect on conversion.

It has also been discovered that the longer the reactor, the further the distance from the reactor inlet at which the para-tertiaryalkylphenol-formaldehyde resin can be introduced. Thus, injection of the resin into a large tubular reactor, that is, a tube with an inside diameter of ½ inch or greater and a length of more than several hundred feet, is preferably made at a distance from the reactor inlet of about 80 to about 95 percent of the total length of the reactor; while with a small tubular reactor, that is, a tube with inside diameter of less than ½ inch and a length of less than about 100 to 200 feet, the optimum point for injection of the resin is located at a distance from the reactor inlet of from about 60 to about 80 percent of the total length of the reactor.

The reason for the effect of reactor size on the optimum point for injection of the para-tertiaryalkylphenol-formaldeyhde resin is believed to be the variation in heat transfer characteristics in reactors of different size, in consequence of which the maximum degree of conversion that will be attained is approached more quickly in small reactors. Since in a small tubular reactor the polymerization may be essentially completed well before the product leaves the reactor, the para-tertiaryalkylphenol-formaldehyde resin should be introduced into the ethylene-polyethylene stream at a point well ahead of the product valve, as indicated above, in order to accomplish the objective of terminating free radicals before an appreciable amount of gel formation can occur. On the other hand, in large tubular reactors, the polymerization is not completed as quickly so that introduction of the para-tertiary-alkylphenol-formaldehyde resin into the reactor nearer the product valve, thereby permitting maximum termination of existent free radicals without significantly decreasing the degree of conversion of monomer to polymer, is preferable. The problem of achieving an adequate degree of mixing of the para-tertiaryalkylphenol-formaldehyde resin with the polyethylene in a large reactor is also avoided by introducing the resin near the product valve as the high degree of turbulence created at the reactor outlet serves to effectively disperse the resin throughout the ethylene-polyethylene stream.

The A-stage para-tertiaryalkylphenol-formaldehyde resin can, of course, be introduced into a tubular reactor at a point closer to the product valve than described above, with partial improvement in reducing gel content. Injection of the resin into the polymerization system at the product valve itself can also be useful in some instances since, though considerable gel formation may have already occurred, the polymer would at least be protected from further formation of gels while it is held in the product receiver. The method of this invention is primarily applicable to production of polyethylene in tubular reactors, but some benefit can also be realized by the addition of the para-tertiaryalkylphenol-formaldehyde resins when a stirred reactor is utilized. In this case, the para-tertiaryalkylphenol-formaldehyde resin can be injected into the line between the reactor body and the product valve to give a partial reduction in gel content.

The A-stage para-tertiaryalkylphenol-formaldehyde resins heretofore described are believed to function in the present invention as temperature stable free-radical traps. These compounds are stable under the severest conditions commonly encountered in the high pressure polymerization of ethylene, that is, temperatures of up to 350° C. for the short periods of time involved between injection of the para-tertiaryalkylphenol-formaldehyde resin and exit of the product stream from the reactor and temperatures of 250° C. or higher for periods of up to several hours while the polymer remains in the product receiver. In contrast, many compounds which are known to function as free-radical traps at lower temperatures are entirely unsuitable for the purposes of this invention as they frequently reverse behavior at temperatures of about 200° C. to 250° C. and generate free radicals rather than trap them. Typical of such compounds is di-tertiarybutyl-para-cresol, which compound is shown in Example 1 to be incapable of inhibiting gel formation in polyethylene under typical process conditions.

Introduction of the suitable para-tertiaryalkylphenol-formaldehyde resins hereinbefore described into the polymerization reaction mixture in the manufacture of polyethylene provides other important benefits in addition to inhibiting gel formation. Thus, the para-tertiary-alkylphenol-formaldehyde resin also serves to narrow the molecular weight distribution of the product. Under conditions where this is an important objective, a point of injection well before the product valve should be selected so that the formation of high molecular weight polyethylene under conditions where the free-radical concentration is relatively low would be minimized; the exact point of addition being dependent upon how sharp a molecular weight distribution is desired. As previously pointed out, however, the para-tertiaryalkylphenol-formaldehyde resin must not be added too soon because of its effect on conversion of monomer to polymer. Generally speaking, practical considerations dictate that the amount of para-tertiaryalkylphenol-formaldehyde resin added and the point at which it is introduced be such that conversion is not cut to less than about 80 to 90 percent of that normal for the particular melt index and density of the polyethylene being formed. Another advantage of the present invention is that the portion of the para-tertiaryalkylphenol-formaldehyde resin which is not combined with the free radicals upon being introduced into the polymerization system is available to serve as an antioxidant or stabilizer at any time the polyethylene is subjected to a degrading environment in further processing or in fabrication to end-use items.

Polyethylene produced by the method of this invention was evaluated by an empirical test procedure in which a numerical film rating, based upon a visual comparison of the film being tested with a series of standard samples, was assigned. The film was rated according to the number of fisheyes and lenses present in a 200 square foot area as determined by means of a Polaroid film-viewer having Polaroid glass laminate sheets oriented so that their planes of polarization are at 90 degrees to each other but at 45 degrees to the direction of film travel through the viewer. For the purposes of this film rating test procedure the terms "fisheye" and "lens" include hard or semi-hard particles (or streaks with tentacles) in the film as well as the true fisheyes and lenses; the term "fisheye" being defined as an inclusion in the film that extends with or without distortion less than 1.5 mils beyond the film surface and is visible between crossed Polaroids and the term "lens" being defined as an inclusion in the film that extends with or without distortion more than 1.5 mils beyond the film surface and is visible between crossed Polaroids.

In the film rating test, the polyethylene film is run through the viewer at a rate of about 15 to 25 feet per minute and the total number of both fisheyes and lenses in the film is noted and the values separately recorded.

A film rating is then assigned in accordance with the following empirical equation:

$$\text{Film rating} = 100 - (0.5N_L + 0.025N_F)$$

where $N_L$ = number of lenses in 200 ft.$^2$ of film,
$N_F$ = number of fisheyes in 200 ft.$^2$ of film.

Consideration of the above equation indicates that the higher the film rating the smaller the number of lenses and fisheyes present in the polymer. Thus, a film sample that was completely free of either fisheyes or lenses would be assigned a film rating of +100; while a film sample having a relatively large number of either fisheyes or lenses or both could have a negative film rating. It has been found that polyethylene produced by the conventional high pressure free-radical initiated polymerization process, without the benefit of the addition of the suitable A-stage para-tertiaryalkylphenol-formaldehyde resins heretofore described, generally has a film rating of about −20 to about −40; while addition of the suitable A-stage para-tertiaryalkylphenol-formaldehyde resins at the optimum concentration and injection point gives a film rating of as high as +50.

The following examples are given to illustrate the invention, it being understood that these examples are not intended to be limiting.

EXAMPLE 1

Ethylene with a purity of about 95 percent and containing 40 p.p.m. of oxygen as catalyst was pumped through a jacketed tubular reactor, having an inside diameter of ½ inch and a length of 481 feet, at a rate of 2000 pounds per hour for a 24-hour period. The tubular reactor was operated at a pressure of 30,000±3,000 p.s.i. and Dowtherm at a temperature of 210° C. was circulated through the jacket. The polyethylene produced had a melt index of 2.5 dgm./minute and a density of 0.918 gram/cc. (values determined in accordance with test procedures D–1238–57T and D–1505–60T respectively, ASTM Standards on Plastics, 12th edition, March 1961).

Polyethylene produced by the above-described procedure was extruded from a 2.5-inch diameter extruder in the conventional manner to produce tubular blown film with a thickness of 1.5 mils which had a film rating value of −20.

After 24 hours of operation of the tubular reactor, a solution consisting of 7.2 lbs. of A-stage para-tertiary-butylphenol-formaldehyde resin dissolved in 48 gallons of toluene was pumped into the reactor without changing the operating conditions. The para-tertiarybutylphenol-formaldehyde resin solution was injected into the ethylene-polyethylene stream at a point 45 feet from the product valve of the 481-foot long reactor and at such a rate as to give a concentration of para-tertiarybutylphenol-formaldehyde resin of 0.09 percent by weight in the polyethylene. The polyethylene produced was extruded in the previously described extruder to produce tubular blown film with a thickness of 1.5 mils and the film rating of this material was determined in the same manner as before. It was found that upon injection of the para-tertiarybutylphenol-formaldehyde resin into the reactor, the polyethylene produced had a film rating of +40 to +50 while there was no change in the degree of conversion, melt index, density, or other properties of the polymer. Operation of the reactor, with continuous injection of the solution of para-tertiarybutylphenol-formaldehyde resin, was continued for a period of 7 hours and periodic testing of samples of the polyethylene film indicated that the film rating of +40 to +50 was maintained. This run demonstrates the effectiveness of the A-stage para-tertiarybutylphenol-formaldehyde resin in inhibiting the formation of gel particles in polyethylene.

In a similar manner, polyethylene with a film rating of +40 to +50 is produced by substituting A-stage para-tertiaryamylphenol-formaldehyde resin or A-stage para-tertiarynonylphenol-formaldehyde resin for the A-stage para-tertiarybutylphenol-formaldehyde resin.

In contrast, a test carried out in a similar manner to that described in Example 1, above, except that 0.1 percent by weight, based on polyethylene, of di-tertiarybutylparacresol was added to the ethylene-polyethylene stream in place of the A-stage para-tertiarybutylphenol-formaldehyde resin, resulted in no measurable improvement in film rating.

EXAMPLE 2

A series of runs was carried out in which ethylene was polymerized in a 3/16-inch I.D. by 60-foot long tubular reactor operated at a pressure of 30,000±2500 p.s.i. and a jacket temperature of 200° C. In each case, oxygen was employed as the catalyst and a solution of A-stage para-tertiarybutylphenol-formaldehyde resin dissolved in benzene and diluted with isooctane to a suitable concentration was injected by means of a high pressure pump into the tubular reactor at a point 12 feet from the product valve and at a flow rate sufficient to give a predetermined concentration of para-tertiarybutylphenol-formaldehyde resin in the system. The polyethylene produced was extruded from a 1¼-inch diameter extruder in the conventional manner to produce tubular blown film with a thickness of 1.5 mils and samples of the film were tested to determine the film rating according to the previously described procedure. For convenience, the operating conditions and results of the series are presented in Table I below:

EXAMPLE 3

A series of runs was carried out in the same reactor and in a similar manner to that described in Example 2, except that the point at which the A-stage para-tertiary-buylphenol-formaldehyde resin was injected into the reactor was varied. The polyethylene produced was extruded from a 1¼-inch diameter extruder in the conventional manner to produce tubular blown film with a thickness of 1.5 mils and samples of the film were tested to determine the film rating according to the previously described procedure. For convenience the operating conditions and results of this series are presented in Table II below.

Table II

| Run number | A[1] | B | C | D |
|---|---|---|---|---|
| Ethylene feed, lbs./hr | 28.6 | 28.0 | 28.5 | 28.1 |
| Oxygen, p.p.m. | 395 | 138 | 138 | 123 |
| Melt index, dgm./min | | 5.5 | 3.8 | 1.96 |
| Density, gms./cc | | 0.9170 | 0.9177 | 0.9180 |
| p-Tertiarybutylphenol-Formaldehyde (wt. percent) | 0.051 | 0.20 | 0.188 | 0.180 |
| Injection point (ft. from product valve) | 60 | 24 | 12 | 0 |
| Film rating | | +20 | +50 | −30 |

[1] In this run, no polyethylene was produced due to the fact that A-stage para-tertiarybutylphenol-formaldehyde resin was added at the reactor inlet in sufficient concentration to completely inhibit the polymerization reaction. The concentration of para-tertiarybutylphenol-formaldehyde resin indicated was calculated from the known rate at which the para-tertiarybutylphenol-formaldehyde resin was introduced into the reactor and the rate at which polyethylene is produced under the conditions employed when no para-tertiarybutylphenol-formaldehyde resin is introduced into the reactor.

The illustrative examples given above clearly demonstrate that addition to the reactor of A-stage paratertiary-alkylphenol-formaldehyde resins in suitable concentration effectively inhibits the formation of undesirable gel particles in polyethylene produced by high pressure, free-radical initiated polymerization of ethylene. The examples also show that the para-tertiaryalkylphenol-formaldehyde resins are preferably added at a particular time in the polymerization process; that is, the resin should be added at a point where the polymerization reaction is well along so that conversion is not adversely affected yet where the polymerization reaction is not so far along that appreciable gel formation will have already occurred. Addition of the para-tertiaryalkylphenol-formaldehyde resin to the reaction system was found to have no undesirable effects on the optical properties of the polyethylene produced; for example, neither haze nor film gloss is significantly affected. Furthermore, addition of the resin in the amounts specified does not significantly change the normal correlation of melt index with density for the polyethylene nor cause any other undesirable effect on polymer properties.

Various changes and modifications can be made in practicing the present invention without departing from it and therefore it is intended to include in the scope of the appended claims all such modifications and variations as may be apparent to those skilled in the art from the description and illustrative examples given herein.

What is claimed is:
1. In a process for the production of solid polyethylene by polymerization of ethylene wherein a longitudinally flowing mass of ethylene at elevated temperature and

Table I

| Run number | A | B | C | D | E | F | G | H | I |
|---|---|---|---|---|---|---|---|---|---|
| Ethylene feed, lbs./hr | 27.8 | 27.8 | 27.9 | 28.7 | 28.3 | 28.5 | 29.3 | 28.1 | 27.9 |
| Oxygen, p.p.m. | 129 | 177 | 192 | 148 | 137 | 138 | 135 | 140 | 141 |
| Melt index, dgm./min | 1.25 | 3.51 | 1.88 | 3.5 | 2.8 | 3.8 | 2.45 | 6.44 | 2.33 |
| Density, gms./cc | 0.9189 | 0.9189 | 0.9208 | 0.9173 | 0.9164 | 0.9177 | 0.9171 | 0.9171 | 0.9182 |
| p-Tertiarybutylphenol-formaldehyde (wt. percent) | 0 | 0.0307 | 0.052 | 0.075 | 0.149 | 0.188 | 0.220 | 0.280 | 0.325 |
| Injection point (ft. from product valve) | | 12 | 12 | 12 | 12 | 12 | 12 | 12 | 12 |
| Film rating | −20 | 0 | +50 | +50 | +35 | +50 | +20 | +35 | +20 | pressure and in contact with a free-radical initiator is maintained in an elongated reaction zone, extending from a reaction zone inlet to a reaction zone outlet at which the polymerization reaction product is withdrawn, the improvement which comprises introducing into said elongated reaction zone within a region extending from about the mid-point of said elongated reaction zone to said reaction zone outlet a small amount, sufficient to reduce gel formation in said solid polyethylene, of an A-stage para-tertiaryalkylphenol-formaldehyde resin wherein the tertiaryalkyl group of the para-tertiaryalkylphenol contains from 4 to about 20 carbon atoms.

2. In a process for the production of solid polyethylene by polymerization of ethylene wherein a longitudinally flowing mass of ethylene at elevated temperature and pressure and in contact with a free-radical initiator is maintained in an elongated reaction zone, extending from a reaction zone inlet to a reaction zone outlet at which the polymerization reaction product is withdrawn, the improvement which comprises introducing into said elongated reaction zone within a region extending from a point at about 60 percent to a point at about 95 percent of the total distance from said reaction zone inlet to said reaction zone outlet a small amount, sufficient to reduce gel formation in said solid polyethylene, of an A-stage para-tertiaryalkylphenol-formaldehyde resin wherein the tertiaryalkyl group of the para-tertiaryalkylphenol contains from 4 to about 20 carbon atoms.

3. In a process for the production of solid polyethylene by polymerization of ethylene wherein a longitudinally flowing mass of ethylene at elevated temperature and pressure and in contact with a free-radical initiator is maintained in an elongated reaction zone, extending from a reaction zone inlet to a reaction zone outlet at which the polymerization reaction product is withdrawn, the improvement which comprises introducing into said elongated reaction zone within a region extending from a point at about 60 percent to a point at about 95 percent of the total distance from said reaction zone inlet to said reaction zone outlet from about 0.02 percent to about 0.50 percent, based on the weight of polyethylene, of an A-stage para-tertiaryalkylphenol-formaldehyde resin wherein the tertiaryalkyl group of the para-tertiaryalkylphenol contains from 4 to about 20 carbon atoms.

4. In a process for the production of solid polyethylene by polymerization of ethylene wherein a longitudinally flowing mass of ethylene at elevated temperature and pressure and in contact with a free-radical initiator is maintained in an elongated reaction zone, extending from a reaction zone inlet to a reaction zone outlet at which the polymerization reaction product is withdrawn, the improvement which comprises introducing into said elongated reaction zone within a region extending from a point at about 60 percent to a point at about 95 percent of the total distance from said reaction zone inlet to said reaction zone outlet from about 0.05 percent to about 0.20 percent, based on the weight of polyethylene, of an A-stage para-tertiaryalkylphenol - formaldehyde resin wherein the tertiaryalkyl group of the para-tertiaryalkylphenol contains from 4 to about 12 carbon atoms.

5. In a process for the production of solid polyethylene by polymerization of ethylene wherein a longitudinally flowing mass of ethylene at elevated temperature and pressure and in contact with a free-radical initiator is maintained in an elongated reaction zone, extending from a reaction zone inlet to a reaction zone outlet at which the polymerization reaction product is withdrawn, the improvement which comprises introducing into said elongated reaction zone within a region extending from a point at about 60 percent to a point at about 95 percent of the total distance from said reaction zone inlet to said reaction zone outlet from about 0.05 percent to about 0.20 percent, based on the weight of polyethylene, of A-stage para-tertiarybutylphenol-formaldehyde resin.

No references cited.